US011865579B2

(12) United States Patent
Brockwell et al.

(10) Patent No.: US 11,865,579 B2
(45) Date of Patent: Jan. 9, 2024

(54) HYBRID COATING PROCESS

(71) Applicant: USG INTERIORS, LLC, Chicago, IL (US)

(72) Inventors: Deirdre Anne Brockwell, Libertyville, IL (US); Wanwisa Davis, Westmont, IL (US); Adam Warren Keller, Grayslake, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 17/249,981

(22) Filed: Mar. 19, 2021

(65) Prior Publication Data

US 2022/0297156 A1 Sep. 22, 2022

(51) Int. Cl.
*B05D 7/00* (2006.01)
*B05D 1/02* (2006.01)
*B05D 1/30* (2006.01)

(52) U.S. Cl.
CPC ............... *B05D 7/546* (2013.01); *B05D 1/02* (2013.01); *B05D 1/305* (2013.01)

(58) Field of Classification Search
None
See application file for complete search history.

(56) References Cited

U.S. PATENT DOCUMENTS 1,769,519 A 7/1930 King et al.
4,353,949 A 10/1982 Kyminas et al.
6,187,697 B1 2/2001 Jaffee et al.
6,316,535 B1 11/2001 Caldwell et al.
7,056,582 B2 6/2006 Carbo et al.
7,230,060 B2 6/2007 Kohr et al.
8,119,560 B2 2/2012 Caldwell et al.
8,133,357 B2 3/2012 Cao et al.
8,210,310 B1 * 7/2012 Yeung ........................ B32B 9/00 181/290
8,536,259 B2 9/2013 Carbo et al.
8,932,704 B2 1/2015 Porbeni et al.
9,267,238 B2 2/2016 Grove, III et al.
9,809,494 B2 11/2017 Rademan et al.
9,956,814 B2 5/2018 Vermeulen
10,155,360 B2 12/2018 Harrison et al.
2003/0087103 A1 5/2003 Belmares et al.
2003/0124330 A1 7/2003 Belmares et al.
2004/0039098 A1 2/2004 Belmares et al.
2005/0181693 A1 * 8/2005 Kajander ............. D06N 3/0063 428/196
2008/0250741 A1 10/2008 Bennett et al.
2010/0047461 A1 2/2010 Colbert
2011/0147119 A1 6/2011 Cao et al.
2011/0319543 A1 12/2011 Carbo et al.
2015/0330072 A1 11/2015 Kragness et al.
2017/0121964 A1 * 5/2017 Wiker ..................... E04B 9/045
(Continued)

OTHER PUBLICATIONS

International Application No. PCT/US2022/071125, International Search Report and Written Opinion, dated Jun. 27, 2022.

*Primary Examiner* — Michael P. Rodriguez
(74) *Attorney, Agent, or Firm* — MARSHALL, GERSTEIN & BORUN LLP

(57) ABSTRACT

The invention provides coating processes for producing finished fibrous panels comprising applying a prime coat onto at least one side of the fibrous panel by curtain coating; and applying a finish coat over the prime coat by spray coating.

13 Claims, 1 Drawing Sheet

(56) References Cited

U.S. PATENT DOCUMENTS

| | | | |
|---|---|---|---|
| 2018/0079691 | A1 | 3/2018 | Donelan et al. |
| 2018/0112402 | A1* | 4/2018 | McCartney ............ B32B 29/02 |
| 2018/0193876 | A1 | 7/2018 | Morris |
| 2018/0251976 | A1 | 9/2018 | Mosiadz |
| 2018/0339504 | A1 | 11/2018 | Ziegler et al. |
| 2018/0346738 | A1 | 12/2018 | Zhang et al. |
| 2019/0024384 | A1 | 1/2019 | Van Giel et al. |
| 2019/0202178 | A1 | 7/2019 | Ziegler |
| 2019/0382589 | A1* | 12/2019 | Li ........................... C09D 7/61 |
| 2020/0002941 | A1 | 1/2020 | Oleske et al. |

* cited by examiner

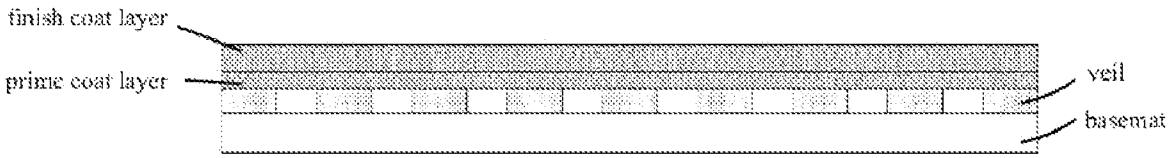
finish coat layer
prime coat layer
veil
basemat

HYBRID COATING PROCESS

FIELD OF THE INVENTION

The invention relates generally to a coating process for producing finished fibrous panels. More specifically, the invention relates to a hybrid coating process for producing finished fibrous panels, particularly ceiling tiles, comprising first performing a curtain coating operation followed by performing a spray coating operation.

BACKGROUND

Fibrous panels, such as ceiling tiles or acoustical panels, are generally laminated structures comprising a basemat and a non-woven glass or glass blended veil. The veil helps to provide a uniform and flat appearance that is often desired in current interior design trends. To achieve the desired light reflectance properties and overall white appearance, the veil is typically spray-coated with paint. It is well known that coating the veil can increase the brightness of the fibrous panel and thus enhance its aesthetic properties. However, coating a surface of the fibrous panel can also negatively affect the ability of the fibrous panel to absorb sound, potentially resulting in undesirable acoustic performance.

A conventional method for producing finished fibrous panels includes one more spray coating operations, for example, spraying a first coating onto the fibrous panel followed by spraying a second coating onto the fibrous panel which may be the same or different from the first coating.

Other methods of applying coatings onto fibrous panels are generally disclosed in US 2004/0039098A1, in which a coating can be applied to a fibrous panel by a method selected from the group consisting of roll coating, spraying, curtain coating, extrusion, knife coating, and combinations thereof. While certain methods for producing finished fibrous panels are known, alternative methods for producing finished fibrous panels with a substantially uniform aesthetic and/or desirable acoustical properties are desired.

SUMMARY

One aspect of the invention provides a method of producing a finished fibrous panel. The method includes providing a fibrous panel, applying a prime coat, by curtain coating, onto at least one side of the fibrous panel, and applying a finish coat, by spray coating, over the prime coat, thereby producing a finished fibrous panel.

Another aspect of the invention provides a method for applying a coating to a fibrous panel, including providing a fibrous panel comprising a basemat and a veil laminated to the basemat, applying a first coating composition, via curtain coating, on the veil to form a prime coat layer, drying the prime coat layer, applying a second coating composition, via spray coating, over the prime coat layer to form a finish coat layer, and drying the finish coat layer.

Further aspects and advantages will be apparent to those of ordinary skill in the art from a review of the following detailed description. While the methods and compositions are susceptible of embodiments in various forms, the description hereafter includes specific embodiments with the understanding that the disclosure is illustrative, and is not intended to limit the disclosure to the specific embodiments described herein.

BRIEF DESCRIPTION OF THE DRAWINGS

FIG. 1 is a cross-sectional view of a coated fibrous panel according to the present invention.

DETAILED DESCRIPTION

The methods for producing a finished fibrous panel disclosed herein generally include applying a prime coat, by curtain coating, onto at least one surface of a fibrous panel (e.g., an acoustical panel or a ceiling tile), followed by applying a finish coat, by spray coating, over the prime coat, for example, onto the prime coat, thereby producing a finished fibrous panel. Similarly, the methods for coating a fibrous panel according to the disclosure generally include providing a fibrous panel, applying a prime coat, via curtain coating, onto at least one side of the fibrous panel; and applying a finish coat, via spray coating, over the prime coat, for example, onto the prime coat, thereby producing a coated fibrous panel. The disclosure further provides methods for coating a fibrous panel, including providing a fibrous panel comprising a basemat and a veil laminated to the basemat, applying a first coating composition, via curtain coating, on at least one surface of the fibrous panel to form a prime coat layer, drying the prime coat layer, applying a second coating composition, via spray coating, over the prime coat layer, for example, onto the prime coat layer, to form a finish coat layer, and drying the finish coat layer, thereby producing a coated fibrous panel.

Advantageously and surprisingly, the methods for producing a finished fibrous panel and/or for coating a fibrous panel disclosed herein produce finished and coated fibrous panels having aesthetic and acoustic properties that are substantially similar to and/or even surpass those of a comparable finished fibrous panel produced by a conventional method including two spray coating operations, even when a relatively high airflow porous veil is used. The results obtained with the disclosed methods are particularly surprising given that a coating process including a step of curtain coating was not expected to provide acceptable aesthetic results, let alone desirable aesthetic results in combination with desirable acoustic properties when a relatively high airflow porous veil is used. In this respect, higher airflow porous veils were expected to require coating with a relatively greater amount of coating composition to achieve acceptable aesthetic properties and thus fibrous panels including the same were expected to have relatively poorer acoustic properties than conventional fibrous acoustical panels. Further still, in embodiments, the disclosed methods can advantageously consume less coating composition while still achieving the aforementioned desirable aesthetic and acoustic results.

It should be noted that the sequence or order of the coating operations is important for achieving the desired acoustic and aesthetic results. For example, when spray coating is conducted as a first coating operation, and followed by a second operation of curtain coating, the aesthetic results are relatively poor.

Typically, the fibrous panels include a basemat and a porous veil laminated to the basemat. In the disclosed methods, the prime coat is typically applied onto a surface or side of the fibrous panel that includes a porous veil. Thus, the prime coat is typically applied onto a porous veil. The methods disclosed herein are particularly advantageous in achieving desirable aesthetic and acoustic properties when a relatively low density porous veil is used.

Generally, the disclosed methods for producing a finished fibrous panel and/or for coating a fibrous panel further include a first drying operation in which the prime coat is dried before applying the finish coat over (e.g., onto) the primer coat. Furthermore, the disclosed methods typically include a second drying operation in which the finish coat is dried after applying the finish coat over the primer coat. Both drying operations are optional, but drying operations are typically performed after the prime coat is applied and after the finish coat is applied.

In embodiments, a coating weight applied by the curtain coating is in a range from about 5 to about 25 g/ft$^2$, preferably from about 8 to about 22 g/ft$^2$, and more preferably from about 10 to about 18 g/ft$^2$.

In embodiments, a coating weight applied by the spray coating is in a range from about 8 g/ft$^2$ to about 25 g/ft$^2$ and/or about 10 g/ft$^2$ to about 22 g/ft$^2$.

In embodiments, the coated fibrous panel has a noise reduction coefficient (NRC) value of at least about 0.70, for example between about 0.70 and about 0.90, and/or between about 0.70 and about 0.85.

In embodiments, the coated fibrous panel has a light reflectance (LR) of at least about 0.85, more preferably at least about 0.90.

As used herein, the terms "panel" and "tile" should be considered interchangeable with respect to the disclosed methods inasmuch as the disclosed methods may be correspondingly applied to both forms. Further, as used herein, the term "fibrous panel" includes both "ceiling tiles" and "acoustical tiles".

Fibrous Panel

A fibrous panel in accordance with the disclosure comprises a basemat having a backing side and a facing side. The fibrous panel typically further comprises a porous veil in contact with at least the facing side of the basemat. The backing side of the basemat may be the side that is directed to the plenum above the fibrous panel in a suspended ceiling tile system. The backing side may alternatively be the side that is directed to a wall behind the fibrous panel in applications where an acoustical panel is provided/installed on walls. Thus, as used herein, the terms "facing side" or "facing surface" refer to the side or surface of the fibrous panel that is directed towards the center of a room when provided/installed in a suspended ceiling tile system or as an acoustical wall panel. In embodiments, the fibrous panel is a ceiling tile.

Basemat

A typical basemat composition includes inorganic fibers, cellulosic fibers, binders and fillers. Inorganic fibers can be either mineral wool (which is interchangeable with slag wool, rock wool and stone wool) or fiberglass. Mineral wool is formed by first melting slag or rock wool in a range from about 1300° C. (2372° F.) to about 1650° C. (3002° F.). The molten mineral is then spun into wool in a fiberizing spinner via a continuous air stream. Inorganic fibers are stiff, giving the basemat bulk and porosity. Conversely, cellulosic fibers act as structural elements, providing both wet and dry basemat strength.

A typical basemat binder is starch. Typical starches used in acoustical panels are unmodified, uncooked starch granules that are dispersed in the aqueous panel slurry and distributed generally uniformly in the basemat. Once heated, the starch granules become cooked and dissolve, providing binding ability to the panel ingredients. Starches not only assist in the flexural strength of the acoustical panels, but also improve hardness and rigidity of the panel. In certain panel compositions having a high concentration of inorganic fibers, a latex is used as the primary binder.

Typical basemat fillers include both heavyweight and lightweight inorganic materials. A primary function of the filler is to provide flexural strength and contribute to the hardness of the panel. Even though the term "filler" is used throughout this disclosure, it is to be understood that each filler has unique properties and/or characteristics that can influence the rigidity, hardness, sag, sound absorption and reduction in the sound transmission in panels. Examples of heavyweight fillers include calcium carbonate, clay, or gypsum. An example of a lightweight filler includes expanded perlite. As a filler, expanded perlite has the advantage of being bulky, thereby reducing the amount of filler required in the basemat. It is also contemplated that the term "filler" includes combinations or mixtures of fillers.

Examples of basemat compositions, as well as binders and fillers included therein, are described in U.S. Pat. No. 8,133,357 incorporated herein by reference in its entirety. The basemat of the fibrous panel of the invention can also include a variety of other additives and agents. For example, the basemat can include a calcium sulfate material (such as, stucco, gypsum and/or anhydrite), boric acid and sodium hexametaphosphate (SHMP). Kaolin clay and guar gum may be substituted for stucco and boric acid when manufacturing acoustical tile.

The basemat of the fibrous panel can be prepared using a variety of techniques. An illustrative procedure for producing the basemat is described in U.S. Pat. No. 1,769,519, which is hereby incorporated herein by reference.

The basemat to which a veil is laminated may have any suitable airflow to achieve the required acoustic performance, for example, a rate of airflow passing perpendicularly there through in an amount of at least about 100 liters of air per square meter of sample per second (l/m$^2$/s), for example, about 100 l/m$^2$/s to about 2500 l/m$^2$/s, about 500 l/m$^2$/s to about 2000 l/m$^2$/s, about 1000 l/m$^2$/s to about 1500 l/m$^2$/s, about 100 l/m$^2$/s to about 1500 l/m$^2$/s, about 500 l/m$^2$/s to 1000 l/m$^2$/s, about 1000 l/m$^2$/s to about 2500 l/m$^2$/s, or about 1500 l/m$^2$/s to about 2000 l/m$^2$/s. Basemat airflow can be measured as generally described in ASTM D737, "Standard Test Method for Air Permeability of Textile Fabrics."

Veil

Suitable veils and methods for making the same are known in the art. A representative veil composition and procedure for manufacturing the same is described in U.S. Pat. Pub. No. 2005/0181693, which is hereby incorporated herein by reference. In embodiments, the veil comprises a porous woven a porous, non-woven fiberglass or fiberglass blended material. The veil may be a non-woven, short or medium strand, continuous fiberglass type material that has a multi-directional and random, overlapping fibrous orientation which allows for significant air permeability and flow in all of its directions.

The veil is typically very permeable due to including many relatively large pores both in the surface and throughout as a result of using relatively coarse fibers. The veil preferably has suitable porosity to allow airflow and acoustic transmission to the basemat. In preferred embodiments, the veil is a high airflow veil which has a higher airflow than conventional porous veils which generally have airflows of about 2000 liters of air per square meter of sample per second (l/m$^2$/s). In embodiments, the veil, for example, may be a "high airflow veil" having a rate of airflow passing perpendicularly there through in a range of about 2200 to about 4500 liters of air per square meter of sample per second ($l/m^2/s$), about 2500 to about 4500 $l/m^2/s$, about 2800 to about 4300 $l/m^2/s$, about 3000 to about 4000 $l/m^2/s$, about 3200 to about 3800 $l/m^2/s$, about 3300 to about 3500 $l/m^2/s$, and/or about 3400 $l/m^2/s$. In preferred embodiments, the term "high airflow veil" as used herein refers to a porous veil having an airflow of at least 2800 $l/m^2/s$ and/or at least 3000 $l/m^2/s$. Air permeability is typically measured as described in ASTM D737, "Standard Test Method for Air Permeability of Textile Fabrics."

In embodiments, the high airflow veil is substantially free of brighteners and fillers based upon visual inspection by the naked eye, such that the high airflow veil appears to be composed of fiber alone to the naked eye and is significantly more translucent than conventionally used veils. As used herein, "substantially free of brighteners and fillers" means that the high airflow veil does not contain significant amounts of brighteners and fillers, with the result that the high airflow veil has an opacity value of less than about 60%, more preferably less than 50%, for example, the high airflow veil may have an opacity value between about 20% and about 60%, and/or between 20% and 50%, whereas the standard veils typically have opacities of 70% or even greater. Opacity is typically measured as described in ASTM D2805, "Standard Test Method for Hiding Power of Paints by Reflectometry."

Generally, therefore, it is understood that suitable high airflow veils are substantially translucent, particularly when compared to conventional veils, and therefore are incapable of visually concealing the perforations of the underlying fibrous mat and providing desirable aesthetics without further modification.

Curtain Coating

Curtain coating is a process in which a curtain coater creates an uninterrupted, free falling vertical curtain flow of a liquid coating composition from a coating chamber and the liquid coating composition is deposited onto a moving substrate. The substrate is moved on a conveyor through the curtain coater at various speeds. In embodiments, the substrate is a fibrous panel, preferably, a ceiling tile.

The liquid coating composition is first mixed and added into a coating reservoir. In embodiments, the liquid coating composition is an aqueous-based coating composition, comprising water, binder(s), filler(s), and additive(s). In embodiments, the binders are latex polymers. In embodiments, suitable fillers include, but are not limited to, calcium carbonate, titanium dioxide, clay, and the like. In embodiments, the additives can include, but are not limited to, dispersants, water softeners, surfactants (e.g., non-ionic surfactants), biocides, defoamers, thixotropic agents, flow agents, and combinations thereof.

In some embodiments, a liquid coating composition of the invention comprises about 30 to about 65 wt. % of water, about 1.5 wt. % to about 7.5 wt. % of binder, specifically, a latex polymer binder, about 30 wt. % to about 65 wt. % of filler, and about 0.01 to about 10 wt. % of additives. Coating composition components are described by mass of solids where applicable (thus, in the aforementioned liquid coating composition, the latex polymer component is expressed as solids only, and any water that may be present is included with the water component). In one exemplary embodiment, the liquid coating composition applied via curtain coating is described in Table 1.

TABLE 1

| Ingredients | Range | Preferred Range |
|---|---|---|
| Water | ~30-65 wt. % | ~40-50 wt. % |
| Filler | ~30-65 wt. % | ~40-60 wt. % |
| Latex Polymer Binder | ~1.5-7.5 wt. % | ~1.5-5 wt. % |
| Additives | ~0.01-1 wt. % | ~0.01-0.7 wt. % |

Suitable fillers include Titanium Dioxide, Calcium Carbonate, Calcined clay, Kaolin Clay, and mixtures thereof. Other mineral fillers and extenders can also be included including but not limited to limestone, Wallastonite, Diatomaceous Earth, and mixtures thereof. The latex polymer may be an acrylic latex, typically a vinyl acrylic latex. The liquid coating composition may further optionally include a polymeric resin, for example, in an amount between about 3 wt. % and about 15 wt. %.

Coat weight is a measurement of the amount of coating added the substrate. The coat weight can be controlled by adjusting the speed of the conveyor and/or adjusting the size of a slot opening of the curtain coating head which may be pressurized as is known in the art. In embodiments, the coat weight of the coating composition deposited by curtain coating is from about 5 $g/ft^2$ to about 25 $g/ft^2$, preferably from about 8 $g/ft^2$ to about 22 $g/ft^2$, and more preferably from about 10 $g/ft^2$ to about 18 $g/ft^2$. Coat weight for a specific coating process can be measured by passing a substrate of known area and weight through the coating equipment in the same manner as a ceiling tile, with the wet weight of the substrate directly after coating being compared to the (dry, uncoated) weight of the substrate prior to coating. Coat weight is reported as the difference in weight (between the wet substrate weight and the uncoated substrate weight) divided by the surface area of the substrate. Thus, for a specific tile, coat weight can be determined by subtracting the weight of the combination of the basemat and veil laminated to the basemat from the weight of the coated basemat and veil laminated to the basement, and dividing by the surface area of face side of the fibrous panel. Generally, it is not necessary to use a fibrous panel and any substrate of known weight can be used to measure coat weight for a specific process.

In embodiments, the flow of the liquid coating is substantially continuous and uniform, such that a substantially uniform coating layer is applied in the form of a wet film onto the fibrous panel substrate. Curtain coating, however, when used alone, does not provide the desired aesthetic properties (even when two curtain coating operations are performed).

Advantageously, any excess unused liquid coating composition may be recovered and circulated back to a curtain coating reservoir and then pumped to the curtain coating head for application.

Spray Coating

Spray coating is frequently used to apply coatings onto various substrates. A conventional spray coating process comprises pumping a coating composition through filters into a spray head. In embodiments, the spray head may reciprocate perpendicular to the direction of the movement of a substrate as is known in the art. In spray coating, a coating is created from the spray head in the form of droplets and coats the substrate while leaving uncoated spaces, which can result in an uneven, spotted appearance. In embodiments, spray coating is used to apply a finish coat layer on top of a previously applied primer coat layer applied via curtain coating. Advantageously, the disclosed methods utilizing both curtain coating and spray coating in combination and in sequence enable formation of fibrous panels having aesthetic and acoustic properties that are substantially similar to and/or even surpass those of a comparable finished fibrous panel produced by a conventional method including two spray coating operations, even when a relatively low density porous veil is used.

The coating composition used in the spray coating process according to the invention is typically an aqueous coating composition, comprising water, binder(s), filler(s), and any additive(s). In one preferred embodiment, on a relative weight percent basis, the coating composition used in the spray coating process includes a greater amount of latex polymer binder than is present in the coating composition used in the curtain coating process, for example, greater than 50 wt. % more, greater than 60 wt. % more, or greater than 70 wt. % more.

In some embodiments, a coating composition of the invention comprises about 30-65 wt. % of water, about 2.5-10 wt. % of binder, specifically a latex polymer binder, about 30-65 wt. % of filler, and about 0.01-10 wt. % of additives. Coating composition components are described by mass of solids where applicable (thus, in the aforementioned liquid coating composition, the latex polymer component is expressed as solids only, and any water that may be present is included with the water component). In one exemplary embodiment, the filler comprises $CaCo_3$, $TiO_2$, calcined clay, and Kaolin clay, and the liquid coating composition applied via spray coating is described in Table 2.

TABLE 2

| Ingredients | Range | Preferred Range |
|---|---|---|
| Water | ~30-65 wt. % | ~40-55 wt. % |
| Fillers | ~30-65 wt. % | ~40-60 wt. % |
| Latex Polymer Binder | ~2.5-10.0 wt. % | ~2.5-7.5 wt. % |
| Additives | ~0.01-1.0 wt. % | ~0.01-0.7 wt. % |

In embodiments, the binder is a latex polymer binder. The latex polymer may be an acrylic latex, typically a vinyl acrylic latex. In embodiments, suitable fillers include, but are not limited to, Titanium Dioxide, Calcium Carbonate, Calcined clay, Kaolin Clay, and mixtures thereof. Other mineral fillers and extenders can also be included including but not limited to limestone, Wallastonite, Diatomaceous Earth, and mixtures thereof. The liquid coating composition may further optionally include a polymeric resin, for example, in an amount between about 5 wt. % and about 15 wt. %. In embodiments, the additives can include, but are not limited to, dispersants, water softeners, surfactants (e.g., a non-ionic surfactant), biocides, defoamers, thixotropic agents, flow agents, and combinations thereof.

In embodiments, a coat weight applied by the spray coating is in a range from about 8 $g/ft^2$ to about 25 $g/ft^2$ and/or about 10 $g/ft^2$ to about 22 $g/ft^2$.

Drying

The methods of the invention may further comprises drying steps. In embodiments, a method of coating the fibrous panel further includes steps of drying the prime coat layer and drying the finish coat layer. Drying can remove any water used as a carrier for the coating composition or any of the components thereof. Therefore, after a coating composition has been applied to the fibrous panel, the fibrous panel is heated to effect drying.

In some embodiments, the fibrous panel is dried after a prime coat layer is applied using a convention oven or other drying techniques at an elevated temperature to form hard, continuous, uniform dried film.

In embodiments, after the finish coat layer is applied, the prime coat layer and the finish coat layer are dried by conveying the coated fibrous panel through a convection oven or by other drying techniques. In embodiments, a convection oven is used for the drying process.

The duration and temperature of the drying process(es) will affect the rate of drying, ease of processing or handling, and property development of the applied coat layer(s). Generally, the coated layer may be dried at any suitable temperature. In embodiments, a coat layer may be dried at a temperature from about 100° C. to about 400° C., about 175° C. to about 370° C., or about 200° C. to about 215° C., until the fibrous panel is substantially dry, for example, for a period of from about 3 seconds to about 15 minutes, typically one minute or less. Preferably, a prime coat layer may be dried at a temperature from 175° C. to 280° C., and a finish coat layer may be dried at a temperature from 175° C. to 280° C.

Fibrous panels must demonstrate an aesthetic appeal to customers and a certain level of sound absorption to be effective in controlling noise in buildings. The desired aesthetic appeal of a fibrous panel is typically a smooth surface having a suitable CIELAB Color Space value and a high Light Reflectance (LR) value. Sound absorption is typically measured by the Noise Reduction Coefficient (NRC).

CIELAB Color Space Values

CIELAB, defined by the International Commission on Illumination (CIE), is a colorimetric reference system for quantifying and communicating color. CIELAB uses Cartesian coordinates, L*a*b*, to express a color in a color space, wherein L* represents the lightness/darkness, a* represents the redness/greenness, and b* represents the yellowness/blueness. In embodiments, L*, a*, and b* values were measured with a spectrophotometer. In preferred embodiments, L* ranges from about 89 to about 98, a* ranges from about −1.0 to about 1.0, and b* ranges from about 0.5 to about 4.3.

Brightness Values

The ability to reflect light is typically indicated by its Light Reflectance (LR) value as described in ASTM E1477, "Standard Test Method for Luminous Reflectance Factor of Acoustical Materials by Use of Integrating Sphere Reflectometer." As is known in the art, the LR value ranges from 0 to 1 and denote the percentage of light that is reflected by the surface of the panel that is being tested. For example, an acoustical panel that reflects 85% of the light that is shined upon it has a LR of 0.85. In embodiments, the hybrid coating process advantageously provides a LR value of about 0.85 or higher, more preferably about 0.9 or higher, measured using a spectrophotometer.

Acoustical Property

Sound absorption is typically measured by its Noise Reduction Coefficient ("NRC") as described in ASTM C423, "Standard Test Method for Sound Absorption and Sound Absorption Coefficients by the Reverberation Method." The NRC value is an average of four sound absorption coefficients of the particular surface at frequencies of 250 Hz, 500 Hz, 1000 Hz and 2000 Hz, which cover the range of typical human speech. NRC represents the fraction of sound reaching the panel that is absorbed. An acoustical panel with an NRC value of 0.6 absorbs 60% of the sound that strikes it and deflects 40% of the sound. In embodiments, the hybrid coating process advantageously provides an acoustic absorption of about 0.70 NRC or higher, as measured by ASTM C423, for example between about 0.70 and about 0.90 and/or between about 0.70 and about 0.85.

EXAMPLES

Example 1

A fibrous panel comprising a basemat and a veil laminated on the basemat is coated using the hybrid coating method of the invention. The basemat is a conventional basemat comprising set gypsum. The veil is a high airflow veil having an airflow of about 3400 $l/m^2/s$. The fibrous panel is placed on a conveyor and moved through a curtain coater at a speed of about 250 feet per minute (fpm) for applying a prime coat layer. The coating weight applied by the curtain coater is about 13.5 $g/ft^2$. The curtain coated fibrous panel is then dried in an oven at a temperature of approximately 175° C. The fibrous panel coated with the prime coat layer is then moved through a sprayer for applying a finish coat layer onto the prime coat layer. The application rate of the spray coating is about 16 $g/ft^2$. The spray coated fibrous panel is then dried in an oven at approximately 220° C.

The obtained fibrous panel coated with the final coat layer has been tested for the values of the CIELAB Color Space, NRC, and LR. The results are shown in Table 3.

Comparative Example 1

A fibrous panel is coated using a method comprising two spray coating process, wherein the fibrous panel includes a basemat and a veil laminated on the basemat. The basemat is the same as used in Example 1, but the veil is a conventional veil that noticeably contains brighteners and fillers based upon visual inspection by the naked eye, the veil having an airflow of about 2000 $l/m^2/s$. The fibrous panel is placed on a conveyor, moving through a first sprayer booth for applying a first layer of coating followed by drying in a dryer to drive off water from the first coating layer. The first spray coating has an application weight of about 15 $g/ft^2$ and an application rate of about 250 fpm. The coated fibrous panel is then moved through a second spray booth for applying a second layer of the same coating and dried in a dryer to drive off water from the second coating layer. The second spray coating has an application weight of is about 15 $g/ft^2$ and an application rate of about 250 fpm.

The obtained coated fibrous panel has then been tested for the values of the CIELAB Color Space, NRC, and LR. The results are shown in Table 3.

TABLE 3

| | CIELAB Color Space Value | | | | |
|---|---|---|---|---|---|
| Test | L* | a* | b* | NRC | LR |
| Example 1 | 96.75 | −0.26 | 2.17 | 0.75 | 0.909 |
| Comparative Example 1 | 96.69 | −0.29 | 2.16 | 0.75 | 0.907 |

Table 3 demonstrates that the coated fibrous panel using the hybrid coating method of the invention shows a similar appearance as the coated fibrous panel coated using two spraying operations.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method of coating a fibrous panel, comprising:

providing a fibrous panel including a basemat having a backing side and a facing side, and a porous veil laminated to the facing side of the basemat;

applying a prime coat onto the porous veil by curtain coating; and applying a finish coat over the prime coat by spray coating, wherein the porous veil is a high airflow porous veil having a rate of airflow passing perpendicularly there through in a range of about 3000 to about 4000 liters of air per square meter of sample per second ($l/m^2/s$) and is substantially free of brighteners and fillers.

2. The method of claim 1, further comprising drying the prime coat before applying the finish coat, and drying the finish coat after applying the finish coat.

3. The method of claim 1, wherein a coat weight applied by the curtain coating is in a range from about 5 to about 25 $g/ft^2$.

4. The method of claim 1, wherein a coating weight applied by the spray coating is in a range from about 8 $g/ft^2$ to about 25 $g/ft^2$.

5. The method of claim 1, wherein the coated fibrous panel has a noise reduction coefficient (NRC) value of at least about 0.70.

6. The method of claim 1, wherein a light reflectance (LR) of the coated fibrous panel is at least about 0.85.

7. The method of claim 1, wherein the rate of airflow passing perpendicularly through the high airflow porous veil is in the range of about 3300 to about 3500 liters of air per square meter of sample per second ($l/m^2/s$).

8. The method of claim 1, wherein the fibrous panel is a ceiling tile.

9. A method of applying a coating to a fibrous panel, comprising:

providing a fibrous panel comprising a basemat and a porous veil laminated to the basemat, the porous veil is a high airflow porous veil having an airflow rate of about 3000 to about 4000 liters of air per square meter of sample per second ($l/m^2/s$) and is substantially free of brighteners and fillers;

applying a first coating composition, via curtain coating, on the high airflow porous veil to form a prime coat layer;

drying the prime coat layer;

applying a second coating composition, via spray coating, over the prime coat layer to form a finish coat layer; and drying the finish coat layer.

10. The method of claim 9, wherein a coating weight applied by the curtain coating is in a range from about 5 to about 25 $g/ft^2$.

11. The method of claim 9, wherein a coating weight applied by the spray coating is in a range from about 8 $g/ft^2$ to about 25 $g/ft^2$.

12. The method of claim 9, wherein the fibrous panel after applying the finished coat layer has a noise reduction coefficient (NRC) value of at least about 0.70.

13. The method of claim 9, wherein the fibrous panel after applying the finished coat layer has a light reflectance (LR) of at least about 0.85.

* * * * *